United States Patent [19]

Satomi et al.

[11] Patent Number: 5,588,197
[45] Date of Patent: Dec. 31, 1996

[54] METHOD OF MANUFACTURING METALLIC VACUUM DOUBLE-WALLED CONTAINER

[75] Inventors: Yasuhiko Satomi; Seiichi Itoh; Eiji Otsuka; Jun Yamaki; Takashi Kato, all of Tokyo, Japan

[73] Assignee: Nippon Sanso Corporation, Tokyo, Japan

[21] Appl. No.: 442,202

[22] Filed: May 16, 1995

Related U.S. Application Data

[62] Division of Ser. No. 165,405, Dec. 10, 1993, abandoned.

[30] Foreign Application Priority Data

Dec. 24, 1992 [JP] Japan ..................... 4-344927

[51] Int. Cl.⁶ .................................................. B23P 19/04
[52] U.S. Cl. ................................... 29/455.1; 29/422
[58] Field of Search ........................ 29/422, 455.1, 29/447; 72/379.04; 53/86; 220/420, 421

[56] References Cited

U.S. PATENT DOCUMENTS

| | | | |
|---|---|---|---|
| 4,251,252 | 2/1981 | Frazier | 29/455.1 X |
| 4,288,894 | 9/1981 | Jacobellis | 29/422 X |
| 4,471,206 | 9/1984 | Nagai | 53/86 X |
| 4,493,201 | 1/1985 | Schmidt | 29/422 X |
| 5,082,508 | 1/1992 | Nelson . | |
| 5,153,977 | 10/1992 | Toida et al. | 29/455.1 |
| 5,430,927 | 7/1995 | Rogers | 29/447 |

FOREIGN PATENT DOCUMENTS

| | | | |
|---|---|---|---|
| 0497064A1 | 8/1992 | European Pat. Off. | 29/455.1 |
| 910981 | 6/1946 | France | 29/455.1 |
| 58-071336 | 4/1983 | Japan . | |
| 1303112 | 12/1989 | Japan . | |
| 2286110 | 11/1990 | Japan . | |

OTHER PUBLICATIONS

ASM Handbook, vol. 4, "Heat Treating", Aug. 1991, revised by Joseph Douthett, pp. 774–776.

Metals Handbook, vol. 1, "Properties and Selection: Irons Steels & High Performance Alloys", 1990 ASM International, pp. 888–889.

*Primary Examiner*—Peter Vo
*Attorney, Agent, or Firm*—Hoffmann & Baron

[57] ABSTRACT

A metallic vacuum double-walled container and manufacturing method therein is provided in which an inner container and outer container are both formed from a metal. From among the aforementioned, at least the outer container possesses a body which is formed by rolling a steel plate with a Vickers hardness of 250–600. The outer container is then shaped into a cylindrical body, and joined to a processed inner container at their mouth portions to form a metallic double-walled container. This metallic double-walled container is then heat treated at a temperature of 200°–600° C. under a vacuum, and the space between the two walls of the metallic double-walled container is vacuum sealed to form the final product.

2 Claims, 5 Drawing Sheets

METHOD OF MANUFACTURING METALLIC VACUUM DOUBLE-WALLED CONTAINER

This is a divisional of copending application Ser. No. 08/165,405, filed on Dec. 10, 1993, now abandoned.

BACKGROUND OF THE INVENTION

1. Field of the Invention

The present invention relates to a stainless steel vacuum double-walled container; and manufacturing method therein, for use as a portable thermos bottle, pot, jar and the like.

2. Relevant Art

Vacuum double-walled containers manufactured from stainless steel require a sufficient mechanical strength to prevent exterior damage or deformation due to impacts sustained when dropped or acted on by an exterior force: in particular, containers for use as portable thermos bottles require an increased strength. The strength of the container is approximately proportional to the hardness of the stainless steel plate comprising the container. Consequently, by using a stainless steel with a sufficiently high strength, the thickness of the stainless steel plate material comprising the double-walled container can be reduced, and as a result it is possible to significantly decrease the overall weight of the stainless steel vacuum double-walled container.

With regard to increasing the strength of the stainless steel plate, a method exists in which the draft of the stainless steel component is increased, in order to increase the curing operation (work hardening), by performing refining and/or martensite transformation of the metallic crystal granules during the metal processing.

On the other hand, as a process for vacuum sealing a stainless steel vacuum double-walled container, vacuum sealing processes are known such as those stated in Japanese patent application, first publication No. Sho 59-103633, Japanese patent application, first publication No. Sho 61-106119, or Japanese patent application, first publication No. Sho 58-192516 in which pressure welding and sealing of a chip tube is performed after creating a predetermined degree of vacuum by discharging the air via a chip tube arranged in the outer container at a temperature of 400° C.–1200° C. under vacuum or atmospheric air conditions, or in which vacuum sealing is carded out by heat processing and then melting a solid brazing material.

However, according to a conventional method for manufacturing a stainless steel vacuum double-walled container, a container is formed by processing a cold-rolled steel plate, e.g. a stainless steel plate with a surface finish such as a No. 2B material according to the JIS standard, by means of rolling, drawing, welding or a similar process. The hardness therein is determined by work processing in this manner, and consequently it is not possible to reduce the plate thickness below the minimum plate thickness required for each respective process.

Furthermore, there are also times when the stainless steel of double-walled containers, which are work hardened by means of heat processing during vacuum sealing, reduce the hardness as a result of annealing. In other words, stainless steel imparted with a high hardness from work hardening is softened when annealed at a temperature of 600° C. or greater. In addition, at a temperature of 600°–800° C., the solid solution carbon precipitates out as a carbide resulting in sensitization, easily occurrence of intergranular corrosion, and reduction of the corrosion resistance. Furthermore, the hardness is further reduced when the carbide is transformed into a solid solution by heating at a temperature of 1000°–1200° C. and returned to an austenite structure. The application of heat during vacuum discharge is important in order to sufficiently discharge the residue gas component in the stainless steel and create a high vacuum. This application of heat requires a temperature at least that of practical use: e.g. in the case of a thermos bottle, a temperature of 100° C. or greater is required in order to store the boiling water. From the aforementioned, in the manufacturing of a light-weight, vacuum double-walled container it is necessary to increase the hardness of the stainless steel material to be used, take into consideration the corrosion resistance according to heat processing, and select conditions which will prevent softening of the stainless steel.

SUMMARY OF THE INVENTION

It is an object of the present invention to provide a stainless steel vacuum double-walled container possessing a light weight and superior impact strength by means of increasing the work hardening of a stainless steel plate.

According to a first aspect of the present invention, in a vacuum double-walled container comprising a double-walled structure formed by joining the mouth portions of an inner container and an outer container manufactured respectively from a metal, and a vacuum insulation layer formed in the space between the aforementioned inner and outer containers, a metal vacuum double-walled container is characterized in that the body therein formed by rolling at least the outer container is formed from a steel plate with a Vickers hardness of 250–600 Hv.

In addition, according to a second aspect of the present invention, with regard to the inner and outer containers forming the double-walled container, a manufacturing method is provided for manufacturing a metal vacuum double-walled container which characterized in that after the steel plate of at least the outer container is rolled to a Vickers hardness of 250–600 Hv and shaped to the cylindrical contours of the container, the aforementioned metal vacuum double-walled container is formed by joining the mouth portion of this outer container with that of a separately processed inner container. This metal vacuum double-walled container is then heat processed under a vacuum at a temperature of 200°–600° C., and the space in between the two walls is vacuum sealed.

In accordance with the present invention, it is possible to adjust the hardness of the stainless steel plate forming the container. By increasing this hardness it is possible to obtain a hardness that is able to withstand impact from exterior forces even when possessing a plate thickness thinner than conventional products. In this manner, the formation of a metal vacuum double-walled container possessing a lighter weight than that of conventional products is possible.

In addition, since it is possible to reduce the plate thickness of the container, the materials cost can be considerably curtailed, thus resulting in the production of an economical product.

Furthermore, in the case of a plate thickness similar to that of conventional products, a product can be manufactured with an superior strength due to the high hardness of the stainless steel plate.

DETAILED DESCRIPTION OF THE PREFERRED EMBODIMENTS

Figure 1:
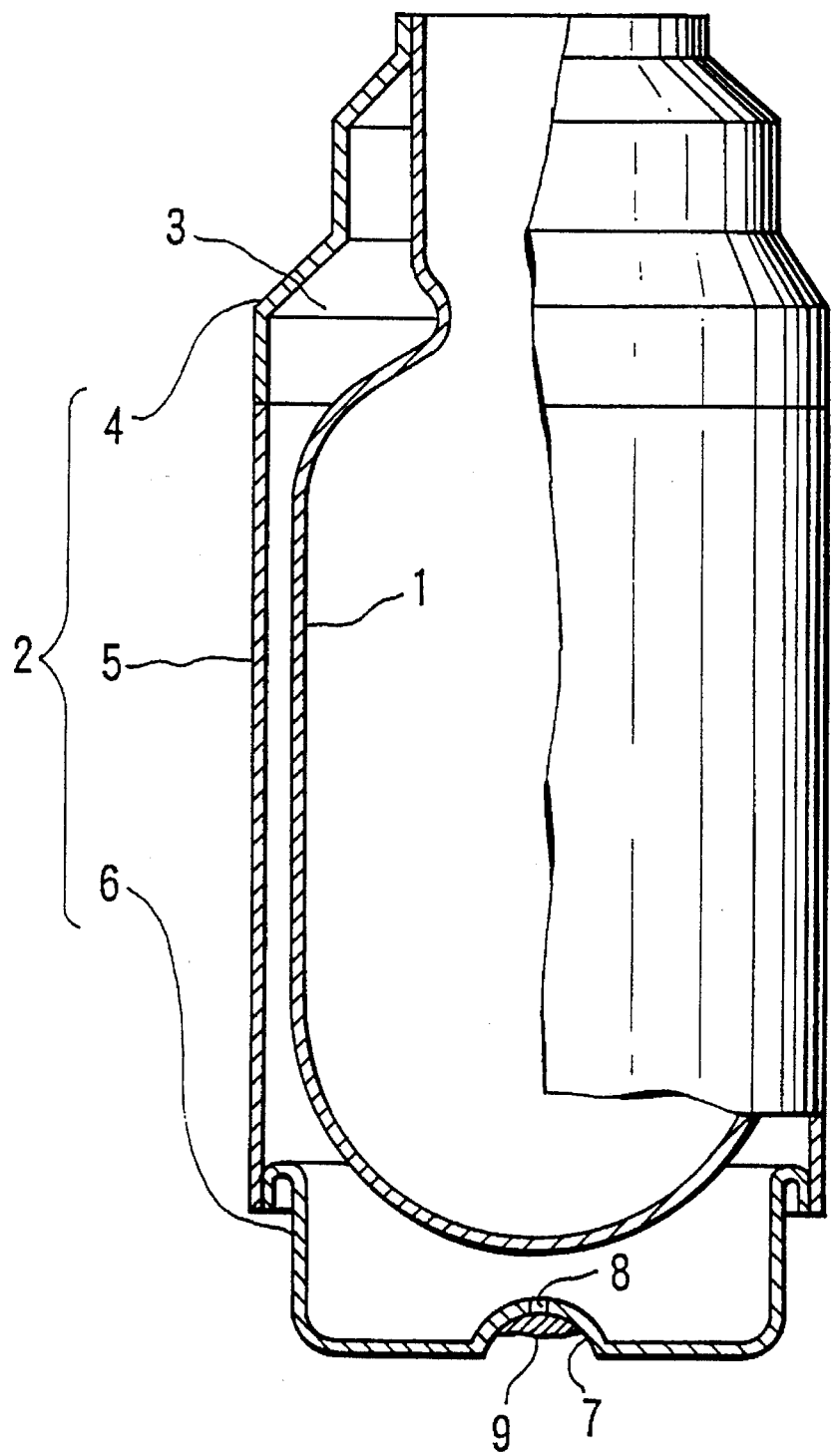
FIG. 1 shows a frontal cross-sectional view of a stainless steel thermos bottle according to an embodiment of a metal vacuum double-walled container of the present invention.

FIG. 1 shows a frontal cross-sectional view of a stainless steel thermos bottle according to an embodiment of a metal vacuum double-walled container of the present invention. This thermos bottle is constructed from an inner container 1 and an outer container 2 both formed from a stainless steel material and are joined at their mouth portions respectively: this thermos bottle further comprises a vacuum insulation layer 3 formed in the space in between inner container 1 and outer container 2. The aforementioned outer container 2 is constructed by joining an upper member 4, body 5 and bottom member 6 by means of welding and thereby forming an integrated body. In addition, a concave portion 7 is provided at approximately the center of bottom member 6, while an exhaust aperture 8 is formed at the approximate center of this concave portion 7. This exhaust aperture 8 is sealed by means of a stopper 9 formed from a metal-like brazing material which melts upon heating to a specified temperature at the time of performing a vacuum exhaust treatment.

This thermos bottle manufactured from stainless steel is formed by previously rolling and adjusting the steel plate to form at least the outer container 2 to a Vickers hardness in the range of 250–600, and then performing an vacuum exhaust treatment under a temperature of 200°–600° C. on the double-wailed container, formed by joining together inner container 1 and outer container 2 into an integrated body. The vacuum is then maintained in the space between the wails of the double-walled container, and the container is sealed. Subsequently, by allowing the container to stand and cool to room temperature, the stainless steel undergoes low-temperature annealing, resulting in a structure in which the super-hardened portion has a decreased plate thickness.

In manufacturing this thermos bottle, a stainless steel plate which has been previously adjusted to a Vickers hardness (Hv) in the range of 250–600 by rolling is used to form the double-wailed container by means of processes such as rolling, drawing, bulging, welding and the like. The container mouth portion is then pointed downward, stopper 9 is inserted into concave portion 7, and the container is placed into a vacuum heating furnace. A predetermined vacuum is subsequently created in the space between inner container 1 and outer container 2 at a temperature of 200°–600° C. by means of this vacuum exhaust treatment, and exhaust aperture 8 of the container is then sealed by means of melting stopper 9. The steel plate then undergoes low-temperature annealing thereby resulting in an increase in the hardness of the stainless steel plate to form the resultant container.

In this manner, a metallic double-wailed container is produced in which an inner container and outer container, formed by plastic working of the stainless steel plate previously adjusted to a Vickers hardness in the range of 250–600 by rolling, are joined to form an integrated body. Subsequently, after this metallic double-walled container undergoes a vacuum exhaust treatment at a temperature of 200°–600° C., low-temperature annealing is performed by allowing the container to cool to room temperature. In order to prove that the stainless steel plate forming, the container constructed in the aforementioned manner can actually be super-hardened, the following experiment was carried out.

Figure 2:
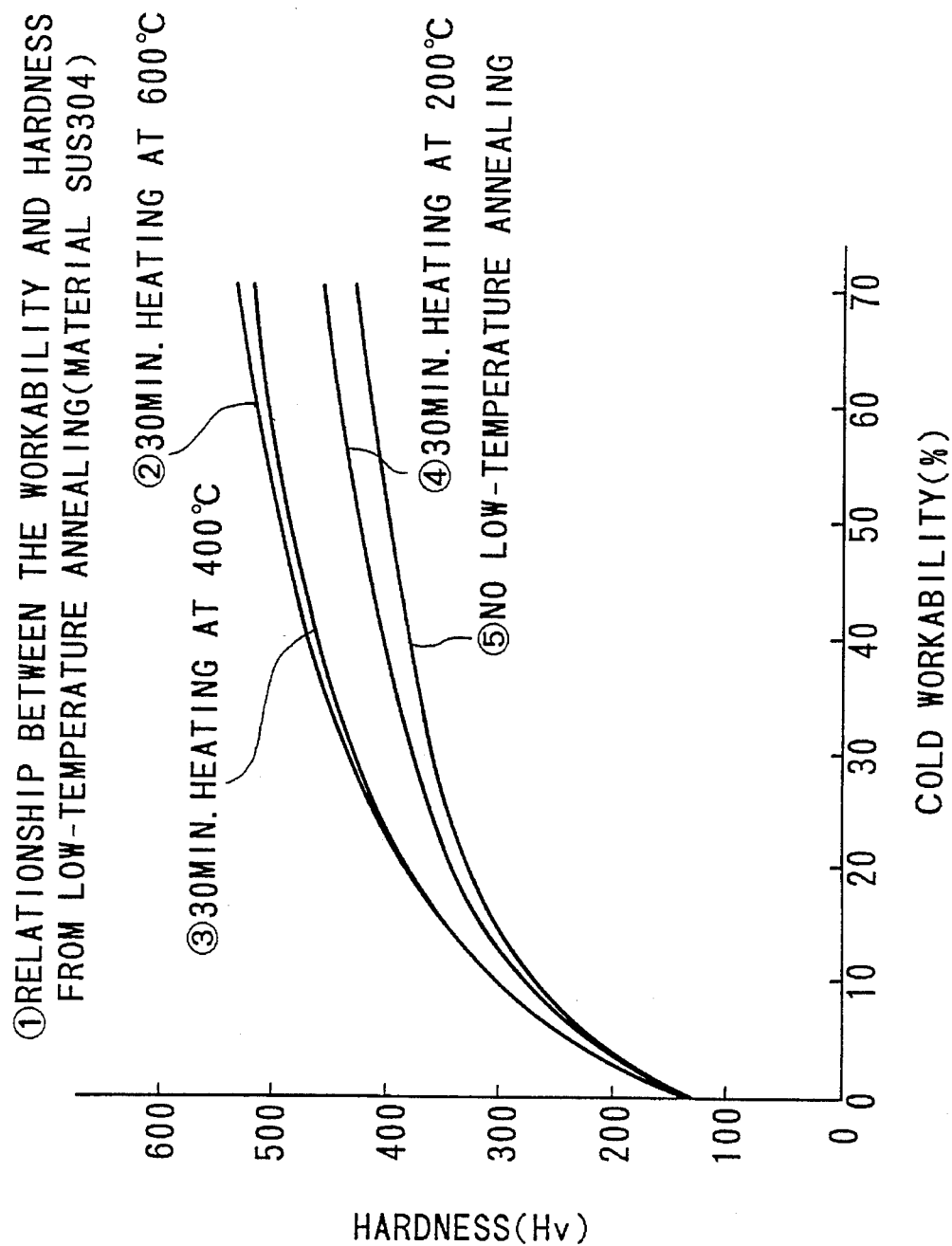
FIG. 2 is a graph showing the relationship between the workability and hardness with regard to low-temperature annealing of a stainless steel plate.

Namely, various types of steel plates were made by cold working stainless steel plates (SUS 304) to a workability in the range of 0–70%, and the Vickers hardness of each stainless steel plate was measured. In addition, the aforementioned stainless steel plates were put through low-temperature annealing for 30 minutes each at 200° C., 400° C. and 600° C. respectively, following which measurements of the Vickers hardness were again performed. The relationship between the workability and hardness according to the low-temperature annealing was then examined. These results are shown in FIG. 2.

In addition, the increase in hardness with regard to differences in the workability and annealing temperature of the same stainless steel plate (SUS 304) are shown in Table 1.

Experimental Method: Test members of thickness 0.5 mm, with 5 cm sides were cold worked to predetermined workabilities. After cold working, each test member was placed in a heating furnace at normal temperature, and the temperature of the furnace was raised to the above specified temperatures which were respectively maintained for 30 minutes. Subsequently, the Vickers hardness was measured after removing the test member from the furnace.

TABLE 1

| Workability (%) | Hardness (Hv) | | | |
|---|---|---|---|---|
| | Without Annealing | 200° C. (Increased Hv) | 400° C. (Increased Hv) | 600° C. (Increased Hv) |
| 10 | 266 | 277 (11) | 303 (37) | 300 (34) |
| 20 | 326 | 342 (16) | 382 (56) | 385 (59) |
| 30 | 360 | 378 (18) | 426 (66) | 433 (73) |
| 40 | 395 | 418 (23) | 483 (88) | 490 (95) |

As seen from FIG. 2 and Table 1, Hv is increased by means of increasing the workability of the stainless steel plate. Additionally, it was discovered that the Hv is further increased when carrying out low-temperature annealing after heat processing at a temperature in the range of 200°–600° C. and returning the cold worked stainless steel plate to room temperature. Consequently, in order to increase the hardness, pressure rolling of the stainless steel plate to serve as the double-walled container material is previously carried out when the steel plate is in a raw material state. A double-walled container is then formed by carrying out processes such as rolling, bulging, drawing, welding and the like, and a vacuum is created in the space between the walls by means of a vacuum exhaust treatment while heating under a temperature of 200°–600° C. After sealing the vacuum, low-temperature annealing is performed upon returning the container to room temperature, thereby resulting in an increase in the hardness of the stainless steel plate. Consequently, the thickness of the stainless steel vacuum double-walled container is reduced, and a reduction in the weight of the container becomes possible.

In the case when the Vickers hardness of the raw material stainless steel plate is less than 250, a sufficiently high hardness is unobtainable for the final product, and reduction of the thickness, and thereby weight of the plate material cannot be sufficiently achieved. In addition, in the case when the Hv is greater than 600, plastic working of the steel plate becomes difficult.

As well, when the temperature of the low-temperature annealing is less than 200° C., the increase in the hardness due to this low-temperature annealing is small, while on the other hand, when this temperature is greater than 600° C., problems arise such as a reduction of the hardness, degradation of the corrosion resistance, and the like.

Furthermore, in the aforementioned embodiment, a stainless steel thermos bottle was used as an example of a metallic vacuum double-walled container, however, it is needless to say that other metallic vacuum double-wailed containers may also be applied according to the present invention. For example, the object shown in FIG. 3 in which a vacuum seal is obtained by means of pressure welding chip tube 10, the stainless steel jar for use in lunch boxes shown in FIG. 5, various types of stainless steel cups, vacuum insulated cooking containers, and the like may also be employed as the stainless steel thermos bottle mentioned above.

(Manufacturing Example 1)

Outer container 2 of the portable thermos bottle shown in FIG. 1 was formed by welding together upper member 4, bottom member 6, and body 5 in such a manner that they formed an integrated body: upper member 4 and bottom member 6 were both formed by means of drawing using stainless steel plates, while body 5 was formed by means of rolling using similar stainless steel plates. The double-walled container formed by joining outer container 2 and an inner container at their mouth portions was then placed into a vacuum heating furnace, and while performing a vacuum exhaust treatment, the container was vacuum sealed by means of melting a stopper 7, formed from a metal-like brazing material, by heating at a temperature of 500° C., thereby producing the product.

The product was formed by using a stainless steel plate (SUS 304) of hardness 320 Hv, which was rolled at a workability of 20%, as the body 5 of the outer container. Moreover, upon examining the strength of the product, it was found that a reduction in plate thickness to approximately 0.25 mm, compared to a conventional plate thickness of 0.5 mm, was possible.

(Manufacturing Example 2)

Figure 3:
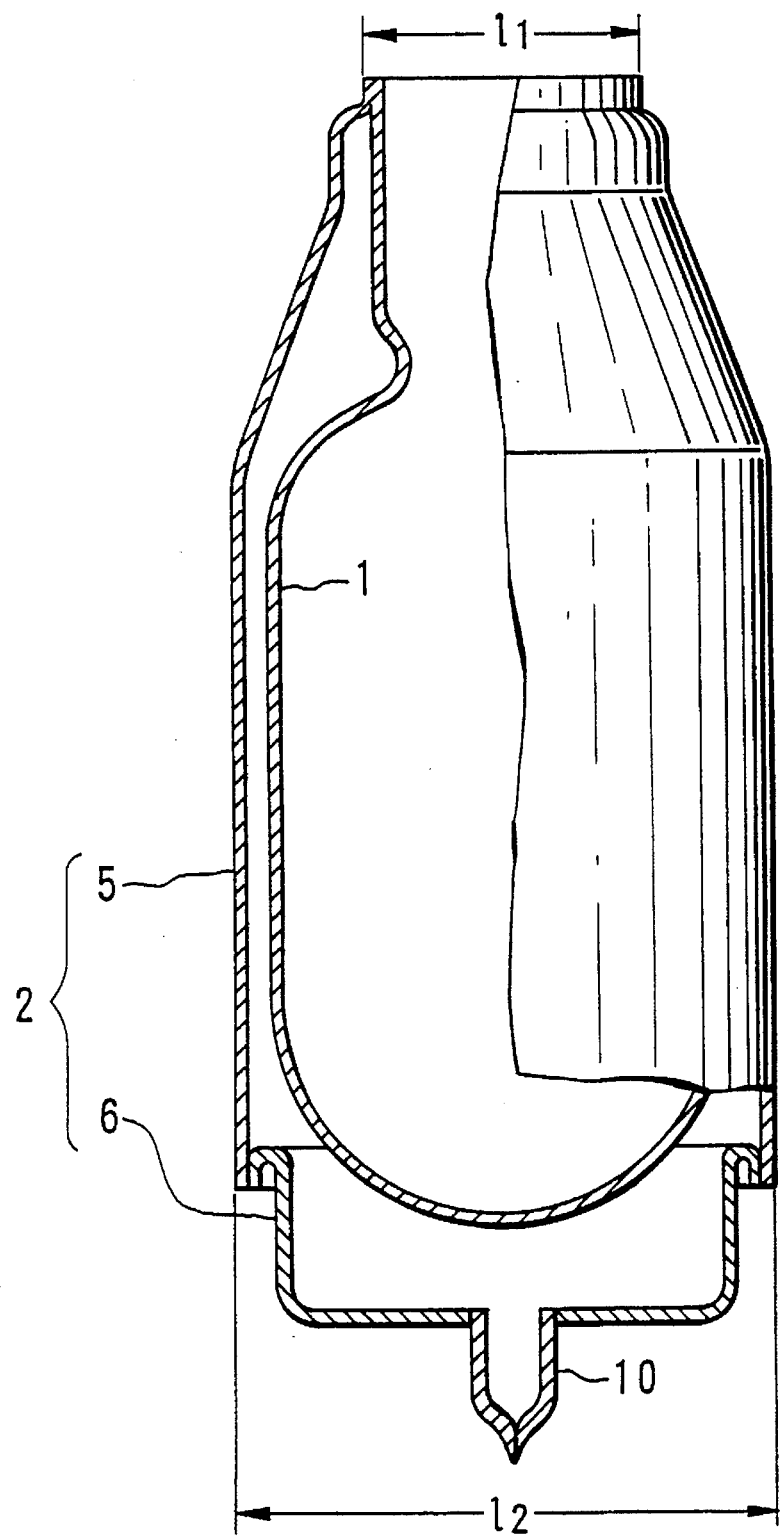
FIG. 3 shows a frontal cross-sectional view of a stainless steel thermos bottle according to a second embodiment of a metal vacuum double-walled container of the present invention.
Figure 4:
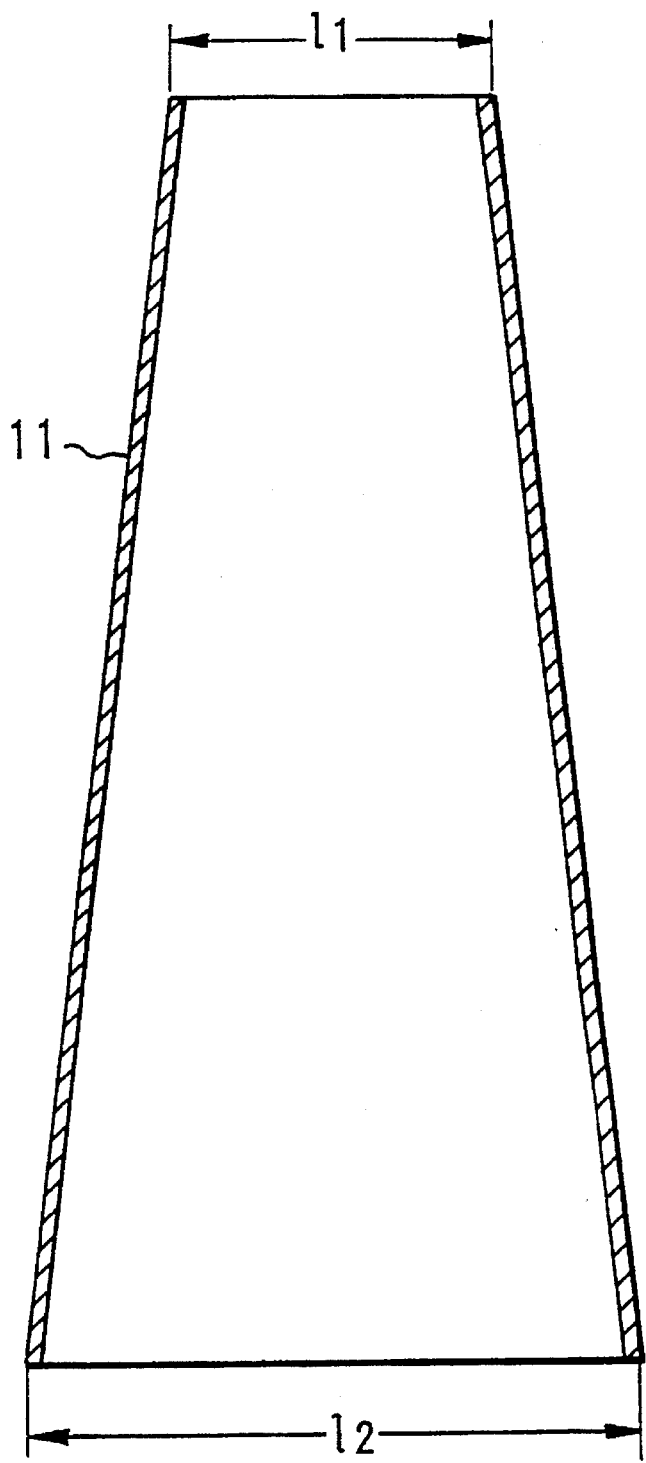
FIG. 4 shows a frontal cross-sectional view of a tapered tube used in the manufacturing of structural members of the same thermos bottle.

Outer container 2 of the portable thermos bottle shown in FIG. 3 was formed by welding together a body 5, shown in FIG. 4, which was formed from a tapered tube 11 by means of pressing or bulging, and a bottom member 6, formed by means of drawing. The double-walled container formed by joining outer container 2 and an inner container at their mouth portions was then placed into a vacuum heating furnace, and a vacuum exhaust treatment was performed at a temperature of 450° C. in atmospheric air, with the vacuum exhaust exiting through a copper pipe 10. After this vacuum exhaust treatment was completed, this pipe 10 was pressure attached to the container, thereby producing the product.

In the above case, body 3 of the outer container was formed using a steel plate material (SUS 304) in a ½ H-shape which had been thermally refined and rolled. Upon examining the strength of the product, it was found that a reduction in plate thickness to approximately 0.2 mm, compared to a conventional plate thickness of 0.4 mm, was possible.

(Manufacturing Example 3)

Figure 5:
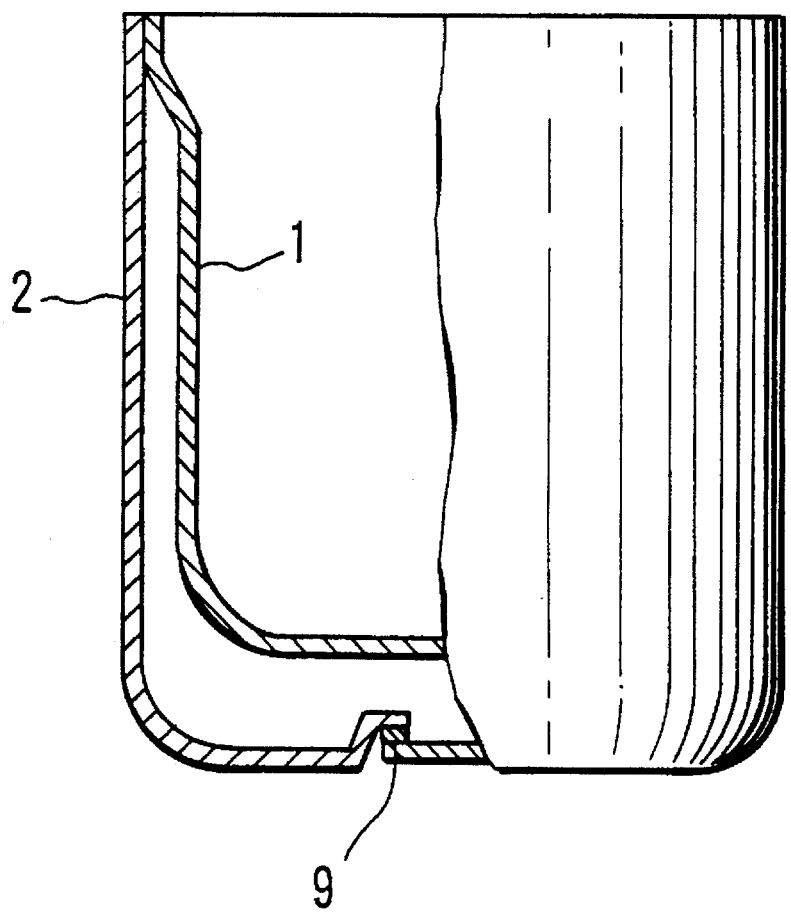
FIG. 5 shows a frontal cross-sectional view of jar for use as a stainless steel valve body according to an embodiment of a metal vacuum double-walled container of the present invention.

Outer container 2 of the jar for use in box lunches shown in FIG. 5 was formed from a stainless steel plate by means of drawing. The double-walled container formed by joining outer container 2 and an inner container at their mouth portions was then placed into a vacuum heating furnace, and while performing a vacuum exhaust treatment, the container was vacuum sealed by means of melting a stopper by heating at a temperature of 300° C.

In this case, a product was formed using a stainless steel plate (SUS 301) of hardness 320 Hv, which had been rolled at a workability of 10%, as the raw material of outer container 2. Upon examining the strength of the product, it was found that a reduction in plate thickness to approximately 0.2 mm, compared to a conventional plate thickness of 0.4 mm, was possible.

Furthermore, as a supplemental test, a test member was formed using a stainless steel plate (SUS 304) of hardness 320 Hv, which had been rolled at a workability of 20%. Upon processing this test member at a temperature greater than 600° C., it was found that the above-mentioned hardness was not obtainable by means of the resultant high-temperature annealing.

In addition, upon examining the increases in hardness obtained from varying workability and annealing temperature using stainless steel material other than SUS 304 (e.g. SUS 301, SUS 201 and SUS 316), it was discovered that similar increases in hardness were obtainable by increasing the workability when heating the rolled steel member at temperatures in the range of 200°–600° C. in the same manner as SUS 304.

What is claimed is:

1. A metallic vacuum double-walled container manufacturing method comprising the steps of:

rolling at least the steel plate of an outer container to a Vickers hardness of 250–600;

shaping said outer container into a cylindrical body;

forming a metallic double-walled container by joining said outer container and a processed inner container at their mouth portions;

heat treating said metallic double-walled container at a temperature of 200°–600° C. under a vacuum; and vacuum sealing the space between the two walls of said metallic double-walled container.

2. A metallic vacuum double-walled container manufacturing method as mentioned in claim 1, wherein in order to increase the hardness therein an austenite stainless steel plate is previously pressure rolled, following which said outer container is formed by performing at least one process, selected from the group consisting of rolling, drawing, bulging and welding, on the rolled member.

\* \* \* \* \*